United States Patent [19]

Falcioni

[11] Patent Number: 5,421,448
[45] Date of Patent: Jun. 6, 1995

[54] BELT CONVEYOR FOR PAINT APPLICATION SYSTEM WITH PIECE SUPPORTING SURFACE CLEANING AND PAINT RECOVERING DEVICE

[75] Inventor: Ezio Falcioni, Pesaro, Italy

[73] Assignee: Falcioni Macchine SRL, Pesaro, Italy

[21] Appl. No.: 255,073

[22] Filed: Jun. 7, 1994

Related U.S. Application Data

[63] Continuation of Ser. No. 80,565, Jun. 21, 1993, abandoned.

[51] Int. Cl.⁶ ............................................. B65G 45/00
[52] U.S. Cl. ...................................................... 198/498
[58] Field of Search ........................ 198/497, 498, 495

[56] References Cited

U.S. PATENT DOCUMENTS

| | | | |
|---|---|---|---|
| 4,324,327 | 4/1982 | Chouteau et al. | 198/497 |
| 4,359,150 | 11/1982 | Bowman et al. | 198/497 |
| 4,811,833 | 3/1989 | Slikker | 198/497 X |
| 4,888,200 | 12/1989 | Milliken | |
| 4,917,231 | 4/1990 | Swinderman | 198/497 |
| 5,147,028 | 9/1992 | Raggi | 198/495 |

FOREIGN PATENT DOCUMENTS

| | | |
|---|---|---|
| 0402589A2 | 12/1990 | European Pat. Off. . |
| 0425969A1 | 5/1991 | European Pat. Off. . |
| 0448080A1 | 9/1991 | European Pat. Off. . |
| 1420666 | 12/1964 | France . |
| 2840803A1 | 4/1980 | Germany . |
| 3227192A1 | 1/1984 | Germany . |
| 3608812A1 | 9/1987 | Germany . |
| 3608812 | 9/1987 | Germany ............................ 198/498 |
| 3641357 | 6/1988 | Germany ............................ 198/498 |
| 1433659 | 4/1976 | United Kingdom ................. 198/498 |
| 2053120 | 2/1981 | United Kingdom ................. 198/498 |
| 0719940 | 3/1980 | U.S.S.R. ............................. 198/498 |
| 0783147 | 11/1980 | U.S.S.R. ............................. 198/498 |

*Primary Examiner*—D. Glenn Dayoan
*Attorney, Agent, or Firm*—Herbert Dubno

[57] ABSTRACT

An automatic paint application system equipped with a belt conveyor for transporting the pieces being painted is provided with a device for continuously cleaning the support surface of the conveyor and for removing the residual paint, and including a cleaning belt made of steel or other suitable material and extending along a path transverse to the conveyor with which it comes in contact with proper incidence angle, so as to act as a doctor or scraper.

3 Claims, 1 Drawing Sheet

BELT CONVEYOR FOR PAINT APPLICATION SYSTEM WITH PIECE SUPPORTING SURFACE CLEANING AND PAINT RECOVERING DEVICE

This is a continuation of application Ser. No. 08/080,565, filed on 21 Jun. 1993, now abandoned.

FIELD OF THE INVENTION

The present invention concerns a belt conveyor for an automatic painting system, equipped with a device that continuously cleans the piece supporting surface from the residual paint, so as to prevent the subsequent pieces to be painted from being soiled.

BACKGROUND OF THE INVENTION

In an automatic painting system the pieces to be painted are transported by a belt conveyor while they are exposed to the paint spray.

Inevitably the residual paint gathers on the conveyor and, if it were not removed therefrom, it would soil the resting surface of the pieces being painted subsequently.

First attempts to clean the belt of the conveyor were by means of doctors or scrapers, that were pushed against the surface to be cleaned.

These have achieved a certain efficacy only with the belts constituted by a set of steel belts placed side by side, but were inadequate in the case of a continuous belt made of synthetic material.

Yet, the belt or multiple-wire conveyors have a further inconvenience, because they allow the paint to infiltrate between the belts or between the wires thus causing the lower panel surface to be soiled and the paint to be wasted.

To avoid this problem, conveyors with protective covers made of a paper sheet or with single disposable sheets of paper have been used.

In this case the danger of soiling the workpiece supporting surfaces was avoided, but the considerable use of paper and the difficulties with its disposal made such solution disadvantageous.

OBJECT OF THE INVENTION

It is therefore the object of the present invention to provide all apparatus free from drawbacks of the prior art.

SUMMARY OF THE INVENTION

The object is achieved by means of a paint application system that essentially includes a belt conveyor and a cleaning belt that cleans the conveyor and recovers the paint.

The cleaning belt is put on edge and is made of steel or another suitable material that extends along a path transversely with respect to the belt conveyor with which it is in contact at a suitable incidence angle, so as to act as a doctor blade or scraper.

The paint particles gathered on the cleaning belt are made to fall into a collecting basin, by means of doctors, or picked up by other cleaning means.

The collected paint can be sent to a container and then recycled. The immediate paint removal obtained by the claimed invention, allows for a better paint recycling compared to conventional systems with fixed doctor blades or wipers.

Also a longer duration of the contact surface is achieved with a belt conveyor for paint application systems with a workpiece support surface cleaning and paint recovering device, characterized in that it includes a belt conveyor and a cleaning belt put on edge and extending transversely to the path of the conveyor, an edge of the cleaning belt touching the conveyor so as to act as a doctor or scraper.

The belt conveyor also includes a support element for holding and maintaining the cleaning belt tight with uniform pressure and incidence angle against the surface to be cleaned.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
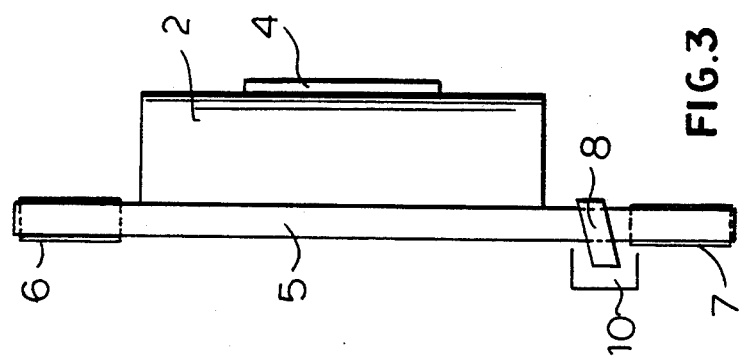
FIG. 3 is a view of the conveyor taken from the side where the pieces come out.

In the accompanying drawing, the reference numeral 1 indicates the belt conveyor that runs around the rollers 2 and 3.

The numeral 4 indicates a panel to be painted, while numeral 5 indicates the conveyor cleaning belt, that runs around the rollers 6 and 7.

The cleaning belt 5 is put on edge and extends along a path perpendicular or, more generally transverse with respect to the path of the conveyors.

An edge of such belt 5 touches, with a suitable pressure and at an proper incidence angle, the lower surface of the conveyor belt 1 so as to gather the residual paint that has been deposited thereon.

Figure 2:
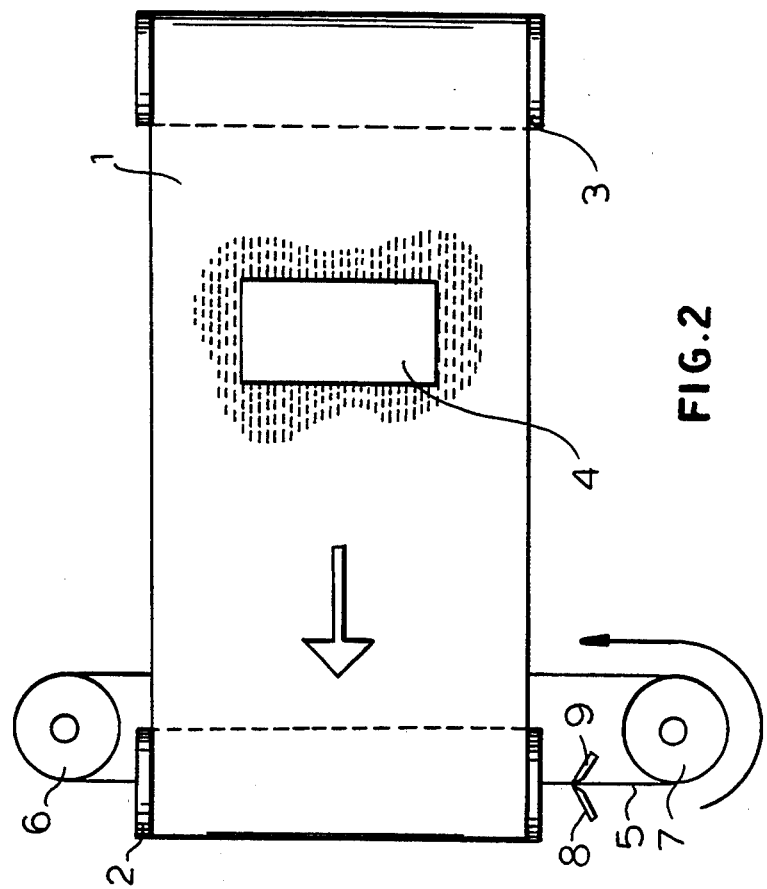
FIG. 2 is a top view.

The paint particles collected by the cleaning belt are made to fall down, by means of the doctors 8 and 9, seen in FIG. 2, into the underlying collecting basin 10 shown in FIG. 3.

The immediate paint removal, obtained with the moving cleaning belt provides a better paint recycling if compared to conventional systems with a fixed doctor blade.

Moreover, a longer duration of the contact surface is achieved because the cleaning belt is longer than a fixed doctor blade.

Figure 1:
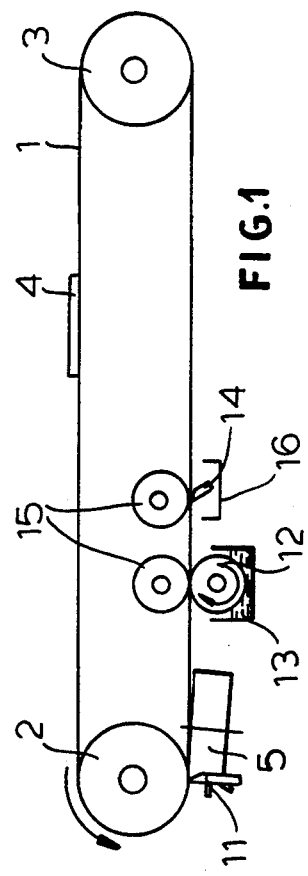
FIG. 1 is a schematic side elevational view of the conveyor with the related cleaning device.

Numeral 22 in FIG. 1 indicates a support element that maintains the cleaning belt tight and assure a uniform pressure of the same against the surface to be cleaned.

The described cleaning device can be integrated with other conventional cleaning mean as shown in FIG. 1. In that figure, numeral 12 indicates a roll that cleans the conveyor belt 1 with a solvent contained in the basin 13, while numeral 14 indicates a doctor blade cleaning and drying the belt contacted with the solvent.

Numeral 15 indicates support rolls. The paint and solvent removed by the doctor 14 are collected in the basin 16 below and it is possible to send them to containers for a subsequent recycling.

In any case, constructive particulars which are not essential could be also different from the ones described as a mere example, without departing from the scope of the present invention.

FIG. 3 illustrates the belt 5 extruding over opposite longitudinal sides of the conveyor 1 and provides an improved cleaning of the conveyor.

What is claimed is:

1. A painting conveyor assembly, comprising:
   a painting conveyor including:

a pair of generally horizontal transport rollers horizontally spaced apart and having respective axes of rotation lying parallel to one another, said transport rollers having respective peripheries, and an endless conveyor belt looped about said peripheries of said transport rollers and having an outer surface running along an upper stretch of said conveyor belt for receiving workpieces to be painted and then returning along a lower stretch wherein said outer surface faces downwardly after said conveyor belt passes around one of said transport rollers;

a belt cleaner below said conveyor belt for removing paint from said conveyor belt, said belt cleaner including:

a pair of cleaning-belt rollers below said conveyor belt rotatable about respective parallel axes which are skew to the axes of the transport rollers, an endless cleaning belt looped around said cleaning-belt rollers and having a single cleaning stretch extending transversely to a direction of travel of said lower stretch all across a width thereof, said cleaning stretch being oblique to said lower stretch and having an edge bearing against said lower stretch in a region in which said conveyor belt lies against said one of said transport rollers, said cleaning stretch of said cleaning belt forming an incidence angle with said lower stretch whereby paint on said outer surface is gathered on said cleaning belt, a pair of doctor blades engaging opposite sides of said cleaning stretch of said cleaning belt to cause paint particles thereon to fall from said cleaning belt, and a basin below said cleaning belt for collecting said paint particles falling from said cleaning belt; and a support member juxtaposed with the periphery of said one of said transport rollers and lying against a portion of said cleaning belt for maintaining said cleaning belt tight and assuring a uniform pressure of said cleaning belt against said outer surface of said conveyor belt.

2. The assembly defined in claim 1 wherein said cleaning belt is composed of steel.

3. The assembly defined in claim 1, further comprising cleaning means downstream of said cleaning belt along said lower stretch for completing cleaning of said cleaning belt.

* * * * *